United States Patent
Guo et al.

(10) Patent No.: US 8,654,711 B2
(45) Date of Patent: Feb. 18, 2014

(54) CHANNEL SCAN FOR SMART METER NETWORKS TO DETERMINE OPERATING CHANNELS

(75) Inventors: Jianlin Guo, Newton, MA (US); Philip Orlik, Cambridge, MA (US); Jinyun Zhang, Cambridge, MA (US); Ghulam M Bhatti, Mansfield, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 141 days.

(21) Appl. No.: 13/404,354

(22) Filed: Feb. 24, 2012

(65) Prior Publication Data

US 2013/0223334 A1 Aug. 29, 2013

(51) Int. Cl.
*H04W 84/18* (2009.01)

(52) U.S. Cl.
CPC ................... *H04W 84/18* (2013.01)
USPC ........... 370/328; 370/238; 370/277; 370/312; 370/315; 455/13.1

(58) Field of Classification Search
CPC ..... H04W 84/18; H04W 8/005; G01D 4/004; H04L 41/127
USPC ............... 370/238, 277, 312, 328, 315, 351; 455/13.1
See application file for complete search history.

(56) References Cited

U.S. PATENT DOCUMENTS

| | | | |
|---|---|---|---|
| 7,564,812 B1* | 7/2009 | Elliott | 370/329 |
| 2004/0122976 A1* | 6/2004 | Dutta et al. | 709/245 |
| 2008/0107091 A1* | 5/2008 | Ramachandran | 370/338 |
| 2009/0161581 A1* | 6/2009 | Kim | 370/254 |
| 2010/0027478 A1* | 2/2010 | Chu et al. | 370/329 |
| 2010/0091715 A1* | 4/2010 | Akchurin et al. | 370/329 |
| 2011/0069665 A1* | 3/2011 | Erdmann et al. | 370/328 |
| 2011/0149858 A1* | 6/2011 | Hwang et al. | 370/328 |
| 2011/0176416 A1* | 7/2011 | Bhatti et al. | 370/230 |
| 2012/0026941 A1* | 2/2012 | Ahmad et al. | 370/328 |
| 2012/0238268 A1* | 9/2012 | Radulescu et al. | 455/435.1 |
| 2013/0034039 A1* | 2/2013 | Wong et al. | 370/312 |

FOREIGN PATENT DOCUMENTS

WO 2011106538 A1 9/2011

* cited by examiner

*Primary Examiner* — Kibrom T Hailu
*Assistant Examiner* — Benjamin Lamont
(74) *Attorney, Agent, or Firm* — Dirk Brinkman; Gene Vinokur

(57) ABSTRACT

An operation channel in a multi-hop network is determined. The network uses a set of channels, and one of the nodes is a network management node. The operation channel is selected in the network management node. Then, the network management node broadcasts a channel information packet including the operation channel using all channels. The channel information packet is received in each of other nodes, either directly from the network management node or from an intermediate node that received and rebroadcasted the channel information packet. Lastly, the operation channel in each node is set according to the channel information packet until the network is formed.

16 Claims, 6 Drawing Sheets

CHANNEL SCAN FOR SMART METER NETWORKS TO DETERMINE OPERATING CHANNELS

FIELD OF THE INVENTION

This invention relates generally to channel scanning in wireless networks, and particularly to channel scanning in multi-hop smart meter networks.

BACKGROUND OF THE INVENTION

1. Smart Meter Networks

Smart meters monitor the use of utilities, e.g., electricity, heat, gas and water, by a consumer. Typically, the smart meter communicates with a utility provider via network or grid, which can include, perhaps, millions of smart meters. Smart meters can turn utilities on or off, record usage information, detect service outages, unauthorized use, control utility consumption, and manage payments.

Smart meters must reliably and securely communicate with utility providers. Wired or wireless mesh network can be used. A number of protocols are known, e.g., ANSI C12.18, ANSI C12.19, and ANSI C12.21 for optical communications, as well as IEEE 802.15.4, IEEE P1901.2, and 802.11. The European Union uses IEC 61107 and IEC 62056. in Japan, the Energy Conservation is involved in promoting smart metering, as well as public and private utilities.

Smart meters can be connected to utility providers via one or more concentrators. The concentrators receive metering information from the smart meters, and forward the information to the providers for controlling or monitoring the utilities. The concentrator can also broadcast control packets to smart meters for management purposes.

Smart meters can be equipped with lower power and lossy transceivers, such as ZigBee radios, and are deployed in a relatively large geometric region, e.g., entire counties. Therefore, smart meters and concentrators form a large scale wireless network, in which the concentrators maintain the network.

in such a large scale wireless network, data packets have to be relayed from a source node (source) to a destination node (destination) by multiple hop communications unless the source and the destination node are one-hop neighbors. Therefore, optimal routing of the packets is of primary importance, because the network requires high reliability and low latency for both metering information and control packet transmission.

Before any packet is broadcasted, the smart meter network must be formed. To form the network, all nodes must operate on the same frequency channel. However, most of the wireless technologies, such as IEEE 802.15.4, support multiple frequency channels. This means that nodes are not necessarily configured to operate on the same channel. Therefore, a channel scan process must be first performed before network formation. For example, in the 802.15.4 network, all devices scan for the channel on which a personal area network (PAN) coordinator operates.

2. Channel Scan

There are typically two types of channel scan methods, namely, active scan and passive scan.

In active scan, a scanning node broadcasts a scan packet on a channel and then waits to receive a scan response packet on that channel. If no scan response packet is received within a pre-defined period of time, the scanning node switches to another channel and continues the scan process.

In passive scan, the scanning node does not broadcast any packet. Instead, the node only detects a packet containing channel information on a channel. If no desired packet is received within a pre-defined period of time, the node changes to another channel and continues the scan process.

In both active scan and passive scan, the node that manages the network can broadcast channel information packet periodically, or on a need basis. The network management node can also broadcast the scan response packet upon receiving the channel scan packet.

3. Conventional Scanning

A wireless standard can define the channel scan methods. For example, Networks according to the IEEE 802.15.4 standard specify four types of channel scans including passive scan and active scan. However, the conventional channel scan methods are designed for prior single hop networks, in which all nodes can receive from network manager and no channel scan relay is needed. Therefore, known channel scan methods are not suited for multi-hop wireless networks such as smart meter networks. With conventional channel scan methods, a node can never receive the channel information packet if the node is not in the transmission range of the network management node. A non-network management node does not relay the channel scan related packet and does not respond to the channel scan packet.

A passive scanning node can miss channel information packet due to channel switching if the waiting time is too short. Missing the packet can cause unpredictable channel scan delay. With a longer waiting time, the scanning node requires a longer time on each channel and therefore, the channel scan process may take more time.

Active channel scan packets can cause significant interference at network startup time when all nodes start broadcasting scan packet, especially in large scale wireless networks such as smart meter networks, which can include thousands of nodes. The interference can also cause unpredictable channel scan delay.

A channel scan process can be performed at network startup time or during normal network operation. Performing fast and reliable channel scan process that minimizes network startup time for large scale multi-hop smart meter networks is very important.

Unlike conventional sensor nodes that are powered by battery, smart meter nodes are typically powered by electricity from the power system. After each power loss, smart meter nodes may need to re-scan for channel because in the smart meter network, the old stored channel information may not be useful.

For example, at startup time, the node that manages the smart meter network can select a different operation channel. Besides startup channel scan, a fast channel scan process during normal network operation is also important for smart meter networks because channel scan packets can interfere with and delay the data packet transmission. Smart meter networks require reliable data packet delivery with low latency. This indicates that the channel scan process during normal network operation must also be performed efficiently.

Therefore, it is desirable to provide fast and reliable channel scanning for large scale multi-hop smart meter networks.

SUMMARY OF THE INVENTION

This invention provides a passive startup channel scan method for a smart meter network for fast channel scan at network startup time. It also provides an active channel scan method to be used after the smart meter network is formed.

A dynamic channel switch method is provided to perform the network channel switch from one channel to another channel during network operation.

In embodiments of the invention, we use one network management node to describe the invented channel scan methods. Our methods can also be applied to networks with multiple network management nodes.

The embodiments of the invention provide fast channel scan methods for large scale multi-hop smart meter networks. The passive channel scan method is provided for efficient channel scan at network startup time. The invented passive channel scan method guarantees that nodes do not miss channel information packet caused by channel switching. All nodes corporately participate in the channel scan process to achieve fast scan.

An active channel scan method is provided to perform channel scan during normal network operation. The invented active channel scan method achieves fast multi-hop channel scan.

A calculation for determining the scanning time is also provided for both the passive scan and the active scan.

A dynamic network channel switching method is provided to the switch entire network from one operation channel to another operation channel.

DETAILED DESCRIPTION OF THE PREFERRED EMBODIMENT

Figure 1:
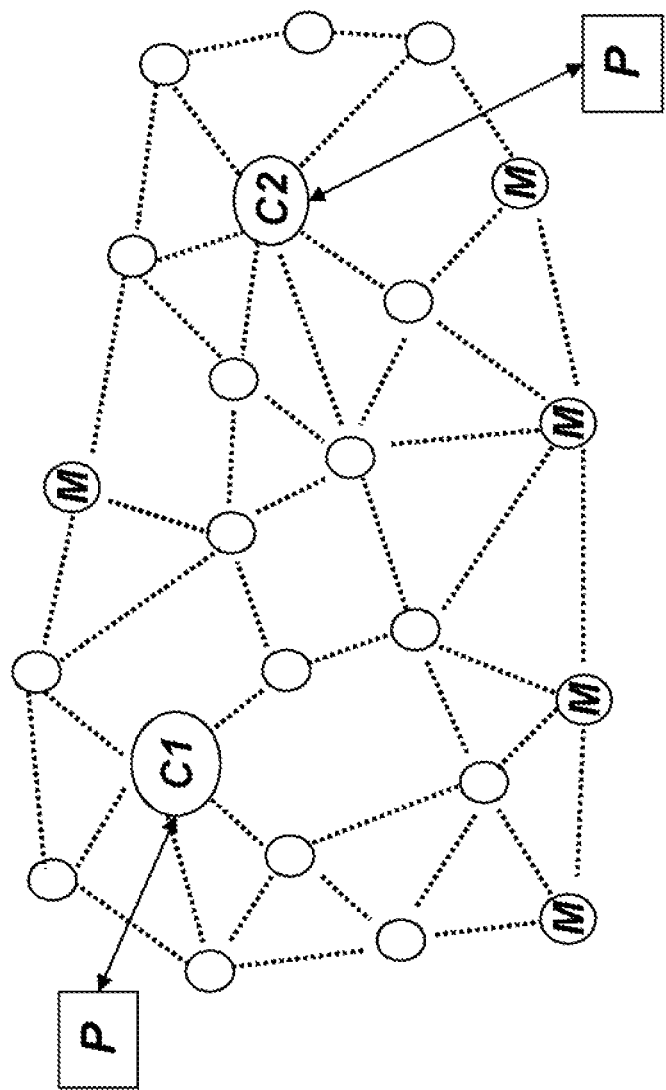
FIG. 1 is a schematic of a smart meter network in which embodiments of the invention operate.

FIG. 1 shows a smart meter network of nodes that uses embodiments of the invention for scanning channels.

The network includes smart meter M, and concentrators C. The nodes are connected to each other by wired or wireless links. The wired links can be via power lines. The method is applicable to any known wireless communication standard.

The concentrators communicate with utility providers P. The nodes and link form a mesh network.

In the smart meter network, each smart meter periodically collects information at a consumer and broadcasts the information to one or more concentrators. The concentrator is responsible for receiving the information and forwarding it to a provider for controlling or monitoring the smart meters. The information is communicated in data packets.

The concentrator can also broadcast control packets to smart meters for management purposes. Smart meters are typically equipped with low power and lossy transceivers, such as the ZigBee radios, and are deployed in relatively large geometric regions. Therefore, smart meters and concentrators form a large scale mesh wireless network, in which the concentrators maintain the whole network.

In such a large scale wireless network, the packets have to be relayed from a source node (source) to destination node (destination) by multiple hop communications unless the source and destination are one-hop neighbors. The routing requires high reliability and low latency for both metering and control information.

In embodiments of the invention, a network management node determines an operation channel of the network with a set of channels. All other nodes scan for the operation channel determined by the network management node to perform operations, such as joining network, discovering routes, broadcasting data packets, and receiving control packet.

During normal network operation, network management node can dynamically change the operation channel of the entire network based on network conditions, environment and other factors.

In the embodiments of the invention, we use the concentrators as the network management node to describe the invented channel scan methods. However, any node can act as the network management node.

We assume that the wireless technology used by the concentrators and the smart meters supports a set of N radio frequency channels: $CH_1, CH_2, \ldots, CH_N$. For example, IEEE 802.15.4 supports a set of 27 channels with one channel using the 868 MHz band, ten channels using the 915 MHz band, and sixteen channels using the 2.4 GHz band.

At network startup time, the concentrator selects channel $CH_O$ as the operation channel for the entire smart meter network, and a smart meter node can select any channel as its startup default channel.

Passive Startup Channel Scan

The startup channel scan method can be used whenever the smart meter network is formed, e.g., during a new installation, after a power loss, on demand, etc.

Passive Startup Channel Scan by Network Management Node

One of the concentrators is designated as network manager. The concentrator selects channel $CH_O$ as an operation channel for smart meter network, based on a configuration of the network, or other input information. The concentrator generates a channel information packet named as a beacon packet (BCN). The beacon packet contains all necessary information required by other nodes for channel scanning, especially the beacon packet contains the operation channel $CH_O$.

The concentrator broadcasts the beacon packet on all available channels. Specifically, the concentrator first broadcasts the beacon packet on channel $CH_O$, and then broadcasts the beacon packet on the other of channels. The order of the channels can be round robin, or other ways, such as random.

Figure 2:
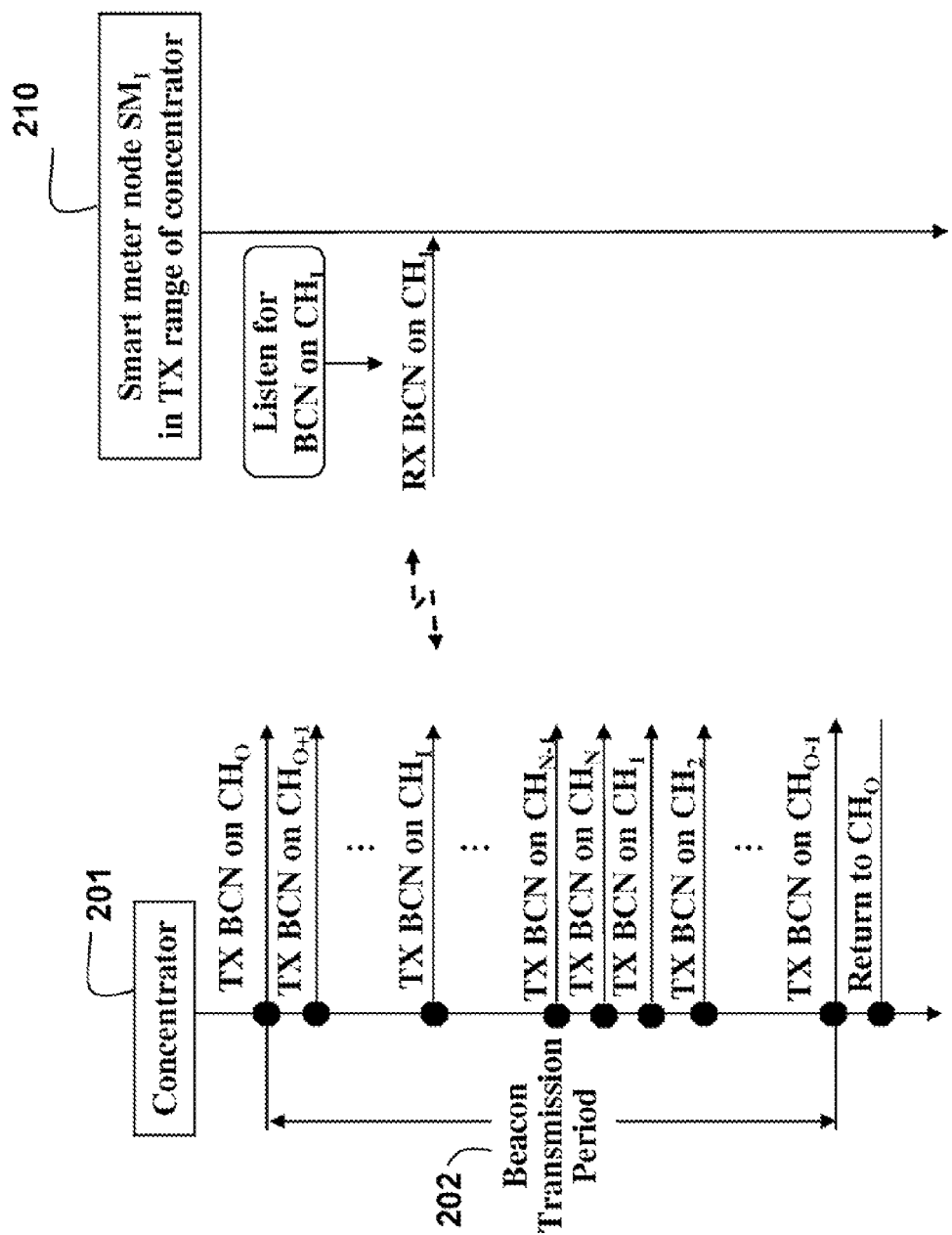
FIG. 2 is a schematic for a passive startup channel scan process for a network management node according to embodiments of the invention.

FIG. 2 shows the round robin channel selection to broadcast (TX) the beacon packet by the concentrator 201 on all channels. At the beginning of beacon packet transmission period 202, the concentrator broadcasts the beacon on operation channel $CH_O$.

Then, the concentrator broadcasts the beacon packet in the following channel order: $CH_{O+1}, \ldots, CH_P, \ldots, CH_{N-1}, CH_N, CH_1, CH_2, \ldots, CH_{O-1}$. After completing the beacon packet transmission on all channels, the concentrator returns to operation channel $CH_O$ to perform functions such as forming the network with the smart meter nodes, and broadcasting control packets to the smart meter nodes, and receiving data packets from the smart meters.

After the smart meter network is formed, the concentrator can only broadcast the beacon packet on the operation channel $CH_O$. The concentrator can broadcast the beacon packet periodically or on demand.

The channel $CH_O$ serves as the operation channel for the entire smart meter network until the concentrator determines to switch to a new operation channel.

Each smart meter 210, in the transmission range, receives the beacon packet to determine the operation channel to be used.

Passive Startup Channel Scan by Non-Network Management Node

It is difficult to determine the necessary waiting for the passive channel scan method to complete. A shorter waiting time can cause a beacon packet miss due to channel switching. That is, the channel scanning node is on another channel when the network management node broadcasts the beacon packet on the operation channel. Channel scan delay caused by the beacon packet miss is unpredictable. In the worst case, a non-network management node never receives the beacon packet. A longer waiting can makes the channel scan process longer.

To avoid the difficulty of determining the waiting time in conventional passive channel scan methods, our invented method provides an innovative passive channel scan method, in which no waiting time is needed, and the smart meter node does not switch channels to detect the beacon packet.

Instead, the smart meter node listens for the beacon packet on its default startup channel, and waits for neighboring nodes to deliver the beacon packet to the node. To do so, the concentrator broadcasts the beacon packet on all channels. Then, the smart meter nodes that received the beacon packet also rebroadcast the beacon packet on all channels.

This guarantees that a smart meter node does not miss the beacon packet broadcasted on the channel it is monitoring.

Conventional Channel Scan

Conventional passive channel scan methods are not designed for multi-hop channel scan. There, all nodes are within transmission range of the network management node. That means that all nodes can receive (RX) the beacon packet from the network management node and it is not necessary to relay the beacon packet. Therefore, the non-network management nodes do not relay the beacon packet. However, that approach does not work for multi-hop smart meter networks.

In the invented channel scan method, all nodes participate in the beacon packet relay process Smart meter nodes within the transmission range of the concentrator can receive the beacon packet from concentrator. These nodes can also receive the beacon packet from their neighboring smart meter nodes when the neighboring nodes rebroadcast the beacon packet. Smart meter nodes outside transmission range of the concentrator can receive the beacon packet only from neighboring smart meter nodes. Upon receiving the beacon packet, a smart meter node rebroadcasts the beacon packet On all channels.

Channel scan for Multi-Hop Network

FIG. 2 shows that the smart meter node $SM_J$ 210 within transmission range of the concentrator receives the beacon packet from the concentrator. The default startup channel of smart meter node $SM_J$ is channel $CH_J$. Therefore, the smart meter node $SM_J$ listens for the beacon packet on channel $CH_J$. Because the concentrator broadcasts the beacon packet on all channels, the smart meter node $SM_J$ receives the beacon packet on channel $CH_J$, when the concentrator broadcasts the beacon packet on channel $CH_J$.

Figure 3:
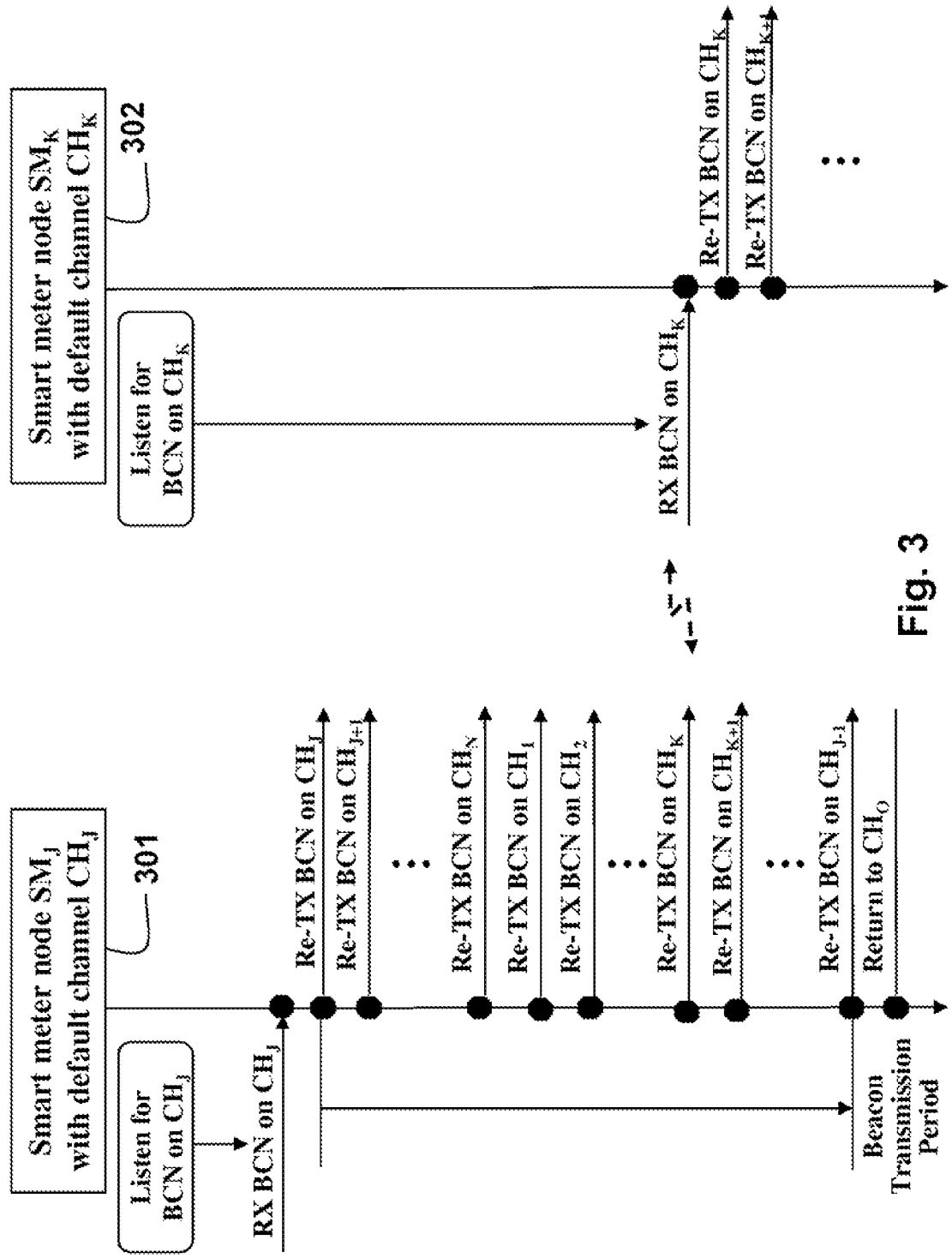
FIG. 3 is a schematic for a passive startup channel scan process for a non-network management node according to embodiments of the invention.

FIG. 3 shows the general passive startup channel scan for smart meter nodes. Nodes $SM_J$ 301 and $SM_K$ 302 are two neighboring smart meter nodes. The smart meter node $SM_J$ with the default channel $CH_J$ listens for the beacon packet on channel $CH_J$. It receives the beacon packet on channel $CH_J$ when the concentrator, or its neighboring smart meter node, broadcasts the beacon packet on channel $CH_J$.

Upon receiving the beacon packet on channel $CH_J$, the smart meter node $S_J$ identifies that the operation channel is the channel $CH_O$. The smart meter node $SM_J$ then rebroadcasts the beacon packet on channel $CH_J$ and the other of channels. The smart meter node $SM_J$ first rebroadcasts the beacon packet on channel $CH_J$ because it is on channel $CH_J$ and no channel switching is needed.

A number of ways can determine the order of the rest of channels for rebroadcasting the beacon packet. FIG. 3 shows a round robin channel order: $CH_{J+1}, \ldots, CH_N, CH_1, CH_2, \ldots, CH_K, CH_{K+1}, \ldots, CH_{J-1}$. After rebroadcasting the beacon packet on all channels, smart meter node $SM_J$ returns to operation channel $CH_O$ to perform other actions such as joining network and discovering routes.

The smart meter node $SM_K$ with the default channel $CH_K$ listens for the beacon packet on channel $CH_K$. It receives the beacon packet on channel $CH_K$ when its neighboring smart meter node $SM_J$ broadcasts the beacon packet on channel $CH_K$. Upon receiving the beacon packet, the smart meter node $SM_K$ then performs the same process as smart meter node $SM_J$ does by starting beacon packet retransmission on channel $CH_K$, $CH_{K+1}$, and so on.

After completing beacon packet broadcasting, the smart meter node $SM_K$ returns to channel $CH_O$.

This beacon packet listening, receiving and retransmission process starts from the smart meter nodes near the concentrator and continues until the beacon packet propagates through the entire network, that is, all smart meter nodes receive the beacon packet.

It is possible that a smart meter node receives multiple copies of the beacon packet broadcasted by its neighboring nodes. However, the smart meter node only rebroadcast the received beacon packet one time.

The purpose of determining the channel order for the beacon packet retransmission over all channels is to speed up the channel scan process. For example, if all or most of the smart meter nodes arc configured with a common default startup channel, the random channel selection scans the channels faster than the round robin channel selection because random channel selection can avoid back-off delay caused by multiple smart meter nodes attempting to broadcast the beacon packet simultaneously on a common channel.

After the smart meter node obtains the channel information, it can only rebroadcast the beacon packet on the operation channel $CH_O$. It can broadcast the beacon packet periodically or on demand.

Passive Startup Channel Scan Time Calculation

In the passive startup channel scan process, each node broadcasts one beacon packet on every channel. If there are M smart meter nodes, the total number of the beacon packet transmission is (M+1)*N.

The time needed by a node to broadcast the beacon packet over all channels is $$\sum_{i=1}^{N} (T_{SW}^i + T_{BK}^i + T_{BCN}^i), \quad (1)$$

where $T_{SW}^i$ is time needed to switch channel to the $i^{th}$ channel, $T_{BK}^i$ is the random back-off time on the $i^{th}$ channel, and $T_{BCN}^i$ is the beacon packet transmission time on the $i^{th}$ channel.

$T^i_{SW}$, $T^i_{BK}$ and $T^i_{BCN}$ depend on various factors such as wireless technology, hardware, software implementation, data rate used, load condition, node density, etc.

If it takes a total H hops for the beacon packet to propagate through the entire network, the total channel scan time is $$\sum_{j=1}^{H} \sum_{i=1}^{N} (T^{ij}_{SW} + T^{ij}_{BK} + T^{ij}_{BCN}), \qquad (2)$$

where $T^{ij}_{SW}$ is time needed to switch channel to the $i^{th}$ channel by the $j^{th}$-hop node, $T^{ij}_{BK}$ is the random back-off time on the $i^{th}$ channel by the $j^{th}$-hop node, and $T^{ij}_{BCN}$ is the beacon packet transmission time on the $i^{th}$ channel by the $j^{th}$-hop node.

If smart meters and concentrator use the IEEE 802.15.4 wireless technology, the total channel scan time can be estimated. It is reasonable to assume that a mode of a Media Access Control (MAC) is non-beacon-enabled because it is impractical to synchronize a large scale multi-hop smart meter network.

Therefore, an unslotted carrier sense multiple access with collision avoidance (CSMA/CA) channel access method is used, and back-off parameters take default values defined by the IEEE 802.15.4 standard. For the 2.4 GHz band, there are sixteen channels and data rate is 250 kbps.

If we assume the number of hop is thirty, then channel switch takes 200 µs, symbol length is 16 µs, and the beacon packet is of a maximum size. If there is one smart meter node on the channel to rebroadcast the beacon packet, only initial back-off is needed. In this case, the total channel scan time is about 3.27552 seconds. If there are about two smart meters on each channel to rebroadcast the beacon packet, then the total channel scan time is about 5.64096 seconds. If there are about three smart meters on each channel to rebroadcast the beacon packet, then the total channel scan time is about 8.85632 seconds.

In the IEEE 802.15.4 standard, the passive scan method is for beacon-enabled PAN and the active scan method is for non-beacon-enabled PAN. The scan time of the passive method depends on a ScanDuration parameter, which ranges from 0 to 14. There is no default value defined for this parameter. If the ScanDuration parameter is 5, then the IEEE 802.15.4 passive scan would take about. 243.3984 seconds if it could work for the multi-hop scan.

Even if the ScanDuration parameter takes value of 0, the passive scan method in IEEE 802.15.4 would take about 14.8416 seconds. The active channel method in IEEE 802.15.4 takes longer time than the passive scan because the active scan needs to perform random back-off and turnaround between transmission mode and receiving mode. Upon successful transmission of the beacon request command, the waiting time for the active scan is the same as for the passive scan.

2. Active Channel Scan During Network Normal Operation

During normal network operation, the channel scan is needed by a newly installed smart meter node, a smart meter node that lost a connection, a smart meter node that never received the beacon packet, etc.

During the normal network operation, the concentrator and the smart meter nodes that have the channel information only broadcast the channel information packet on the operation channel $CH_O$. This means that a smart meter node without channel information can never receive the beacon packet if it only listens for the beacon packet on a channel other than operation channel.

Therefore, the smart meter node that needs to scan or re-scan use the active channel scan. For example, if the new smart meter node is added to an existing smart meter network, the new node can be configured to scan for the channel by using the active channel scan method. Also, if a smart meter node that performs the passive startup channel scan does not receive the beacon packet within a pre-defined time period, it can change to the active scan.

2.1 Active Channel Scan

To perform an efficient channel scan for the smart meter network, the active channel scan method is provided to perform the channel scan after the smart meter network is formed. During the active channel scan, the scanning node broadcasts a channel probe packet (PRB) on a channel and then listens for channel scan for a response packet (PRE) on that channel. In this case, the channel response packet includes the operation channel. If no probe response packet is received within a predefined period of time, the scanning node switches to another channel and performs the active scan again.

For example, in IEEE 802.15.4, a device performs active scan by broadcasting a beacon request command packet. If the coordinator of a non-beacon-enabled PAN receives this command packet, it broadcasts the beacon packet.

In this invention, upon receiving the probe packet, the concentrator can choose to respond or not respond to the scanning node by broadcasting the probe response packet. If the concentrator does not periodically broadcast the beacon packet, it broadcasts the probe response packet. If the concentrator periodically broadcasts the beacon packet and its next scheduled beacon transmission is not near, it can broadcast the probe response packet. Otherwise, the concentrator does not broadcast the probe response packet.

Unlike the conventional active channel scan method, in which the non-network management node does not respond to the probe packet, upon receiving the probe packet, the smart meter node with channel information can also responds to the scanning node by broadcasting a probe response packet.

To determine whether or not the probe response packet should be transmitted, the smart meter node can take the same action as the concentrator does according to its beacon transmission pattern. Upon receiving a probe packet, the smart meter node without the channel information discards the received probe packet, and can continue its own channel scan process.

Figure 4:
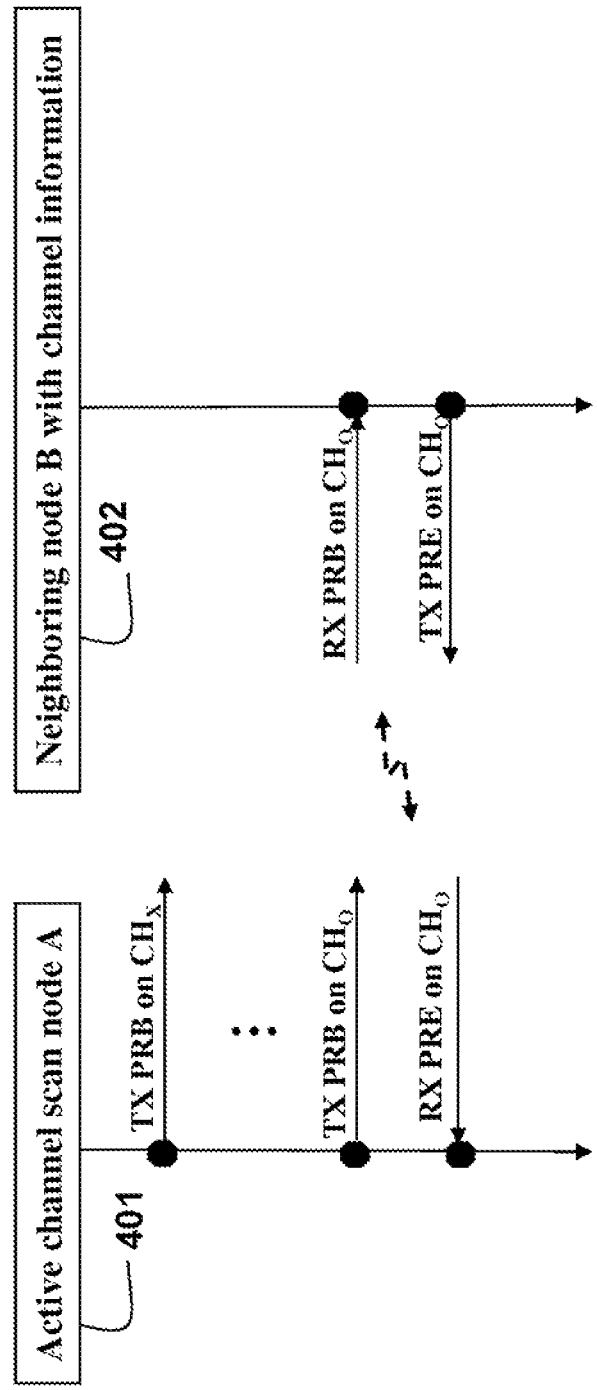
FIG. 4 is a schematic of 1-hop active channel scan process during normal network operation according to embodiments of the invention.

FIG. 4 shows 1-hop active channel scan process. The smart meter node A 401 is the channel scanning node. A node B 402 is a 1-hop neighbor of node A, i.e., node A and node B can receive each other directly. Node B, which is either the concentrator or a smart meter node, has channel information, and therefore, node B use the operation channel $CH_O$.

Node A performs the active channel scan by broadcasting the probe packet on channel $CH_X$. Because no probe response packet is received, the node A continues scanning process on other channels. When node A broadcasts the probe packet on channel $CH_O$, the node B receives the probe packet, and then transmits the probe response packet back to node A on channel $CH_O$.

Node A receives the probe response packet on channel $CH_O$ and completes its channel scanning process.

Figure 5:
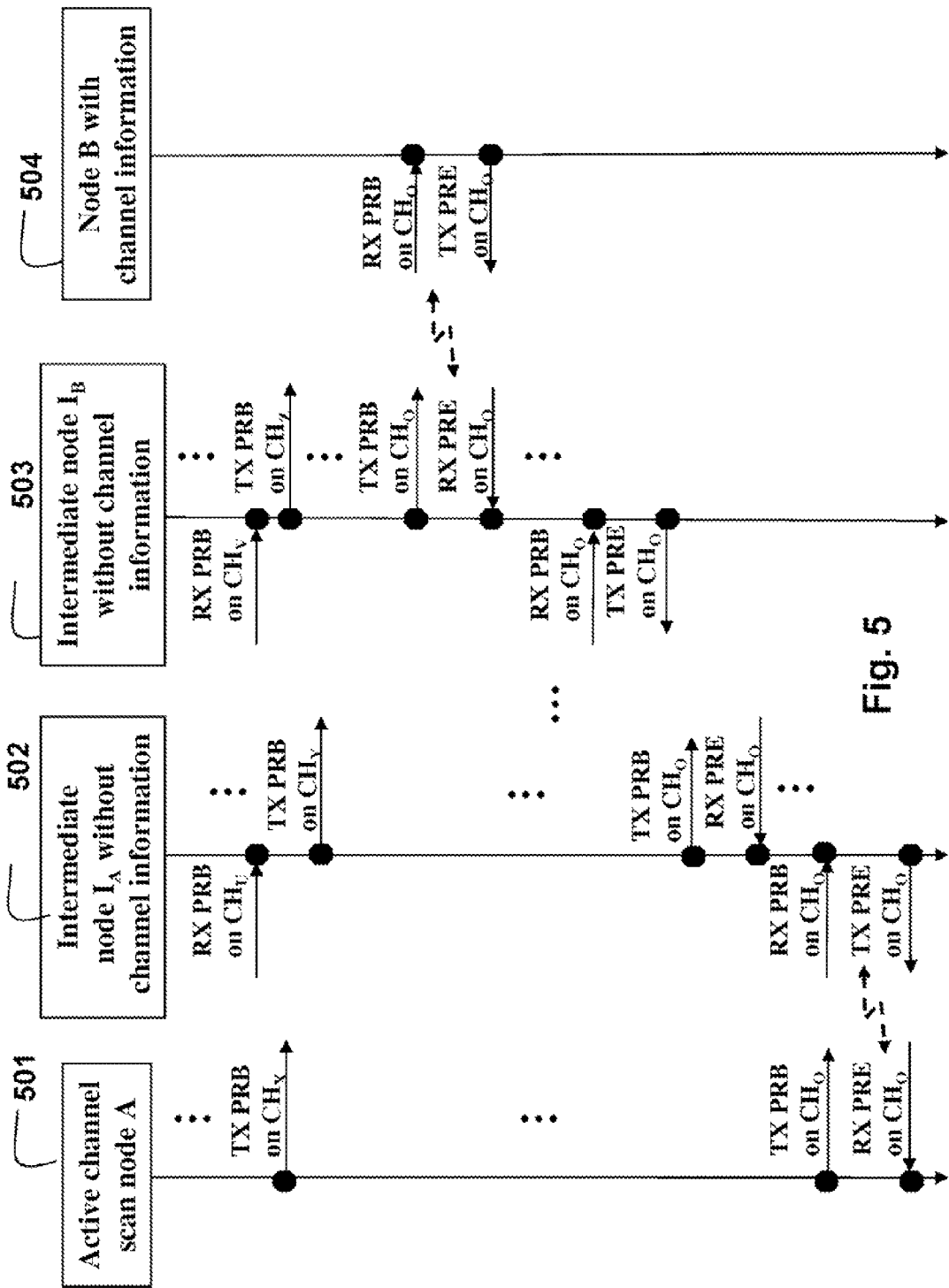
FIG. 5 is a schematic for a multi-hop active channel scan process during normal network operation according to embodiments of the invention.

FIG. 5 shows the general multi-hop active channel scan process. Smart meter node A 501 is the active channel scanning node. Node B 504, which is either concentrator or a smart meter node, has channel information already. That is, node B either generated the beacon packet or received the beacon packet or received the probe response packet. Node B operates on channel $CH_O$ and it is not a neighbor of node A. The intermediate node $I_A$ 502 is a neighbor of node A, and node $I_A$ does not have channel information. The intermediate node $I_B$ 503 is a neighbor of node B, and node $I_B$ does not have channel information either. Node A starts active channel scan process by broadcasting the probe packet over channels.

FIG. 5 shows that node A broadcasts the probe packet on channel $CH_X$. When the node A broadcasts the probe packet on the channel, its neighbor node $I_A$ can or cannot receive the probe packet on that channel.

FIG. 5 shows node $I_A$ receives the probe packet broadcasted by node A on the channel $CH_U$. However, node $I_A$ does not have the channel information, and therefore, node $I_A$ continues its own channel scan process by broadcasting the probe packet over channels such as channel $CH_Y$.

This probe packet transmission and receiving process continues until the intermediate node $I_B$ receives the probe packet on a channel such as channel $CH_V$. Because node $I_B$ does not have the channel information either, it continues its own channel scan process by broadcasting the probe packet over channels such as channel $CH_Z$.

When the intermediate node $I_B$ broadcasts the probe packet on operation channel $CH_O$, node B receives the probe packet. Because node B has the channel information, it transmits the probe response packet back to node $I_B$.

By receiving the probe response packet from node B, node $I_B$ successfully performed its channel scan process and therefore, it operates on operation channel $CH_O$.

When node $I_B$ receives the probe packet on channel $CH_O$ later, it transmits the probe response packet back to the scanning node on channel $CH_O$. This probe response packet receiving and transmission process on channel $CH_O$ continues until node $I_A$ broadcasts a probe packet on channel $CH_O$ and receives the probe response packet on channel $CH_O$.

After its channel scan process completes, node $I_A$ operates on channel $CH_O$. When node A broadcasts the probe packet later on channel $CH_O$, node $I_A$ receives the probe packet and then broadcasts a probe response packet to node A on channel $CH_O$. Upon receiving the probe response packet from node $I_A$, node A completes its channel scan process and operates on channel $CH_O$.

There is the possibility that a smart meter node actively scanning for the channel receives one or more copies of the beacon packet broadcasted by its neighboring nodes. In this case, the active channel scanning node stops its scanning process.

There is also possibility that a smart meter node performing active channel scan receives multiple copies of probe response packet from its neighboring nodes. In any case, scanning node stops channel scan process after it obtains channel information.

2.2 Active Channel Scan Time Calculation

Unlike active scan in IEEE 802.15.4 in which anode scans all channels even if the node knows operation channel information, the invented active scan process stops after scanning node obtains channel information. For an H-hop active scan process, the active scan time can be calculated as $$\sum_{j=1}^{H}\sum_{i=1}^{N_j}(T_{SW}^{ij}+T_{BK}^{ij}+T_{BCN}^{ij}), \quad (3)$$

where $T^{ij}_{SW}$ and $T^{ij}_{BK}$ are same as in equation (2), $N_j$ represents that the $j^{th}$-hop node receives probe response packet after scanning $N_j$ channels, and $T^{ij}_{SCN}$ is the time spent on the $i^{th}$ channel by the $j^{th}$-hop node. $N_j$ is a random variable ranging from 1 to N.

For example, if the $j^{th}$-hop node starts active scan on operation channel $CH_O$, then $N_j=1$, if the $j^{th}$-hop node scans channel $CH_O$ last, then $N_j=N$. If concentrator randomly selects operation channel $CH_O$ with uniform probability and the active scanning nodes randomly select channel to scan for, the expected value of $N_j$ equals to N/2. The $T^{ij}_{SCN}$ includes turnaround time from receiving mode to transmission mode, time to broadcast the probe packet, turnaround time from transmission mode to receiving mode and time to waits for probe response packet.

This active channel scan method is faster than active scan method in IEEE 802.15.4 because this scan method does not scan all channels unless it scans channel $CH_O$ last.

3. Network Channel Switching Process

The concentrator as the network manager can dynamically change the operation channel of the smart meter network based on various reasons such as network conditions and interference from other networks.

Figure 6:
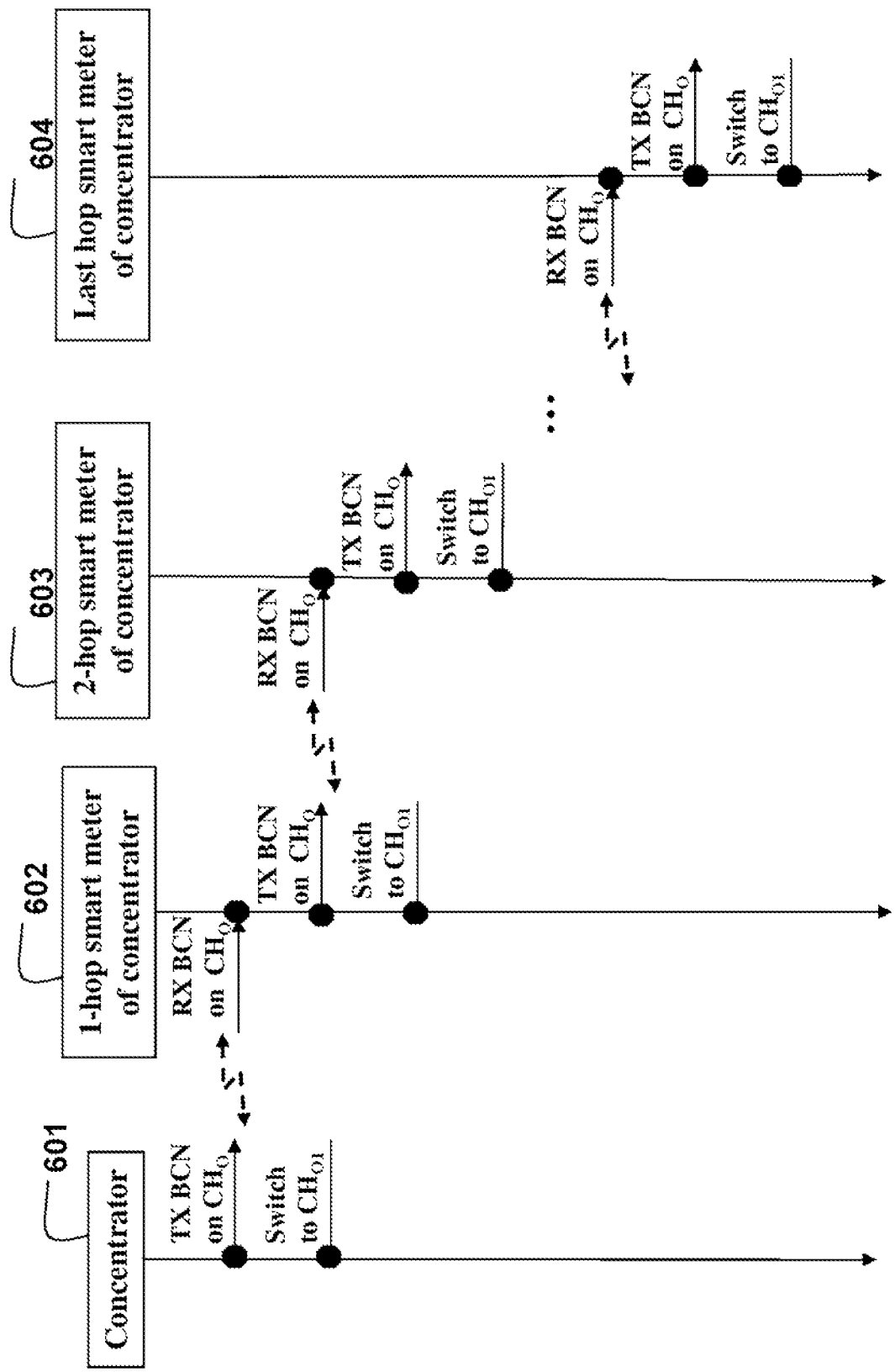
FIG. 6 is a schematic of a network channel switch process during normal network operation according to embodiments of the invention.

FIG. 6 shows network channel switching process in which the current network operation channel is $CH_O$ and new network operation channel is $CH_{O1}$. The channel switching process starts from concentrator 601, 1-hop smart meter nodes 602 of concentrator, 2-hop smart meter nodes 603 of concentrator, and so on, to the last hop smart meter node 604.

To switch smart meter network operation channel, the concentrator broadcasts the beacon packet on the current operation channel $CH_O$. This beacon packet indicates that the new operation channel is $CH_{O1}$. After broadcasting a channel switch beacon packet, the concentrator then switches to the new operation channel $CH_{O1}$.

Upon receiving the channel switching beacon packet on the current operation channel $CH_O$, the smart meter nodes within transmission range of the concentrator, i.e., 1-hop smart meter nodes of the concentrator, rebroadcast the received beacon packet on the current operation channel $CH_O$ and then switches to the new operation channel $CH_{O1}$.

The channel switching beacon packet broadcasted by 1-hop smart meter nodes of concentrator will be received by the 2-hop smart meter nodes. Upon receiving the channel switching beacon packet on the current operation channel $CH_O$, the 2-hop smart meter nodes rebroadcast the received beacon packet on current operation channel $CH_O$ and then switch to the new operation channel $CH_{O1}$.

This channel switching beacon packet receiving/rebroadcasting process continues until the last hop smart meter nodes of concentrator receive channel switching beacon packet and switch to new operation channel $CH_{O1}$, that is, all smart meter nodes switch to new operation channel $CH_{O1}$.

It is possible that a smart meter node receives multiple channel switching beacon packet. However, a smart meter node only rebroadcasts the received beacon packet one time.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for determining an operation channel in a multi-hop network with a set of nodes, and one of the nodes is a network management node, comprising the steps of:

selecting, in the network management node, the operation channel;

broadcasting, by the network management node, a channel information packet including the operation channel in the set of channels;

receiving the channel information packet in each other nodes, either directly from the network management node or from an intermediate node that received and rebroadcasted the channel information packet; and setting the operation channel in each node according to the channel information packet until the network is formed, wherein a number of nodes is M and a number of channels is N, and a time to broadcast the channel information packet on all channels is $$\sum_{i=1}^{N}(T_{SW}^{i}+T_{BK}^{i}+T_{BCN}^{i}),$$

where $T^i_{SW}$ is time needed to switch channel to an $i^{th}$ channel, $T^i_{BK}$ is a random back-off time on the $i^{th}$ channel, and $T^i_{BCN}$ is a transmission time on the $i^{th}$ channel for the channel information packet.

2. The method of claim 1, wherein the network management node broadcasts the channel information packet on the set of channels in a round robin order.

3. The method of claim 1, wherein the intermediate nodes rebroadcasts the channel information packet on the set of channels in a round robin order.

4. The method of claim 1, wherein the intermediate nodes rebroadcasts the channel information packet on the set of channels in a random order.

5. The method of claim 1, wherein the channel information packet is a beacon packet.

6. The method of claim 1, wherein the channel information packet is broadcast periodically.

7. The method of claim 1, wherein the channel information packet is broadcast on an as needed basis.

8. The method of claim 1, where the network management node is a concentrator in a smart meter network.

9. The method of claim 1, wherein each of the other nodes receives the channel information packet on a default channel selected from the set of channels by the node.

10. The method of claim 1, wherein the broadcasting and rebroadcasting continues until all nodes receive the channel information packet.

11. The method of claim 1, wherein the intermediate lodes only rebroadcast the channel information packet one time.

12. The method of claim 1, wherein the channel information packet propagates via H hops, a total channel scan time is $$\sum_{j=1}^{H}\sum_{i=1}^{N}(T_{SW}^{ij}+T_{BK}^{ij}+T_{BCN}^{ij}),$$

where $T^{ij}_{SW}$ is the time needed to switch channel to the $i^{th}$ channel by the $j^{th}$-hop node, $T^{ij}_{BK}$ is the random back-off time on the $i^{th}$ channel by the $j^{th}$-hop node, and $T^{ij}_{BCN}$ is the transmission time of the channel information packet on the $i^{th}$ channel by the $j^{th}$-hop node.

13. The method of claim 1, one of the nodes, after the network is formed, broadcasts a channel probe packet (PRB) on each of the set of channel, until the node that broadcasts the PRB receives a response packet (PRE) including the operation channel.

14. The method of claim 13, wherein the response probe packet is broadcasted by other nodes receiving the channel probe packet.

15. The method of claim 1, wherein the operation channel is changed by the network management node, and the network management node broadcasts the channel information packet with a different operations channel using the current: operation channel.

16. The method of claim 1, wherein the method of determining is performed at a network startup time.

\* \* \* \* \*